(12) United States Patent
White et al.

(10) Patent No.: US 8,553,710 B1
(45) Date of Patent: Oct. 8, 2013

(54) FIBRE CHANNEL CREDIT-BASED LINK FLOW CONTROL OVERLAY ONTO FIBRE CHANNEL OVER ETHERNET

(75) Inventors: Joseph White, San Jose, CA (US); Simon Gordon, San Jose, CA (US); Suresh Boddapati, Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 328 days.

(21) Appl. No.: 12/859,015

(22) Filed: Aug. 18, 2010

(51) Int. Cl.
*H04L 12/54* (2013.01)

(52) U.S. Cl.
USPC ............................ 370/429; 370/389; 370/474

(58) Field of Classification Search
USPC ......................................... 370/389, 429, 474
See application file for complete search history.

(56) References Cited

U.S. PATENT DOCUMENTS

| | | | |
|---|---|---|---|
| 5,457,687 | A | 10/1995 | Newman |
| 5,926,473 | A | 7/1999 | Gridley |
| 5,987,028 | A | 11/1999 | Yang et al. |
| 5,991,295 | A | 11/1999 | Tout et al. |
| 6,049,546 | A | 4/2000 | Ramakrishnan |
| 6,073,089 | A | 6/2000 | Baker et al. |
| 6,370,145 | B1 | 4/2002 | Dally et al. |
| 6,512,747 | B1 | 1/2003 | Umeuchi et al. |
| 6,621,828 | B1 * | 9/2003 | Field et al. .................... 370/466 |
| 6,657,962 | B1 | 12/2003 | Barri et al. |
| 6,944,173 | B1 | 9/2005 | Jones et al. |
| 6,973,032 | B1 | 12/2005 | Casley et al. |
| 6,986,161 | B2 | 1/2006 | Billhartz |
| 7,042,842 | B2 * | 5/2006 | Paul et al. .................... 370/229 |
| 7,046,631 | B1 | 5/2006 | Giroux et al. |
| 7,061,862 | B2 | 6/2006 | Horiguchi et al. |
| 7,075,934 | B2 | 7/2006 | Chiussi et al. |
| 7,173,931 | B2 | 2/2007 | Chao et al. |

(Continued)

FOREIGN PATENT DOCUMENTS

| | | |
|---|---|---|
| EP | 1 892 905 A1 | 2/2008 |
| GB | 2 361 139 A | 10/2001 |
| WO | WO 97/04546 | 2/1997 |

OTHER PUBLICATIONS

Search Report for European Application No. 09170041.9, mailed Nov. 23, 2009 (8 pages).

(Continued)

*Primary Examiner* — Phuc Tran
(74) *Attorney, Agent, or Firm* — Cooley LLP

(57) ABSTRACT

In one embodiment, an apparatus includes an intake buffer module and a flow control module configured to define an available bits indicator, the available bits indicator representing a number of unallocated bits within the intake buffer module. The apparatus further includes a transceiver module configured to transmit, to a peripheral device, a credit update frame based at least in part on the available bits indicator. The transceiver module can be configured to receive a Fiber Channel over Ethernet (FCoE) frame from the peripheral device, a size of the FCoE frame being less than or equal to the number of unallocated bits. The apparatus can further include a switch fabric interface module operatively coupled to a plurality of switch fabric devices that define at least a portion of a switch fabric. The switch fabric interface module can be configured to define at least one cell based at least in part on the FCoE frame and further configured to transmit the at least one cell to at least one switch fabric device from the plurality of switch fabric devices.

20 Claims, 6 Drawing Sheets

(56) References Cited

U.S. PATENT DOCUMENTS

| | | |
|---|---|---|
| 7,185,368 B2 | 2/2007 | Copeland, III |
| 7,230,947 B1 | 6/2007 | Huber et al. |
| 7,233,568 B2 | 6/2007 | Goodman et al. |
| 7,234,168 B2 | 6/2007 | Gupta et al. |
| 7,277,429 B2 | 10/2007 | Norman et al. |
| 7,327,680 B1 | 2/2008 | Kloth |
| 7,391,736 B2 | 6/2008 | Na et al. |
| 7,403,524 B2 | 7/2008 | Hill |
| 7,424,744 B1 | 9/2008 | Wu et al. |
| 7,430,175 B2 | 9/2008 | Dropps et al. |
| 7,519,860 B2 | 4/2009 | Hatonen et al. |
| 7,540,025 B2 | 5/2009 | Tzadikario |
| 7,543,052 B1 | 6/2009 | Cesa Klein |
| 7,564,869 B2 * | 7/2009 | Cafiero et al. ............ 370/466 |
| 2002/0064170 A1 | 5/2002 | Siu et al. |
| 2002/0080789 A1 | 6/2002 | Henderson et al. |
| 2002/0118692 A1 | 8/2002 | Oberman et al. |
| 2002/0154637 A1 | 10/2002 | Keller-Tuberg |
| 2003/0005145 A1 | 1/2003 | Bullard |
| 2003/0026267 A1 * | 2/2003 | Oberman et al. ............ 370/397 |
| 2003/0026287 A1 | 2/2003 | Mullendore et al. |
| 2003/0058880 A1 | 3/2003 | Sarkinen |
| 2004/0013124 A1 | 1/2004 | Peebles et al. |
| 2004/0165598 A1 | 8/2004 | Shrimali et al. |
| 2005/0111460 A1 | 5/2005 | Sahita |
| 2005/0210533 A1 | 9/2005 | Copeland et al. |
| 2005/0226156 A1 | 10/2005 | Keating et al. |
| 2006/0123480 A1 | 6/2006 | Oh et al. |
| 2006/0272018 A1 | 11/2006 | Fouant |
| 2006/0285548 A1 | 12/2006 | Hill et al. |
| 2007/0064617 A1 | 3/2007 | Reves |
| 2007/0067438 A1 | 3/2007 | Goranson et al. |
| 2007/0086464 A1 | 4/2007 | Somashekhar |
| 2007/0094729 A1 | 4/2007 | Hoefelmeyer et al. |
| 2007/0118909 A1 | 5/2007 | Hertzog et al. |
| 2007/0150949 A1 | 6/2007 | Futamura et al. |
| 2007/0180526 A1 | 8/2007 | Copeland, III |
| 2007/0192861 A1 | 8/2007 | Varghese et al. |
| 2007/0240207 A1 | 10/2007 | Belakhdar et al. |
| 2008/0080548 A1 | 4/2008 | Mullendore et al. |
| 2008/0082977 A1 | 4/2008 | Araujo et al. |
| 2008/0151863 A1 | 6/2008 | Lawrence et al. |
| 2008/0259798 A1 | 10/2008 | Loh et al. |
| 2008/0263661 A1 | 10/2008 | Bouzida |
| 2008/0285449 A1 | 11/2008 | Larsson et al. |
| 2009/0003212 A1 | 1/2009 | Kwan et al. |
| 2009/0077663 A1 | 3/2009 | Sun et al. |
| 2010/0061238 A1 | 3/2010 | Godbole et al. |
| 2010/0061239 A1 | 3/2010 | Godbole et al. |
| 2010/0061390 A1 | 3/2010 | Godbole et al. |
| 2010/0158031 A1 | 6/2010 | Thomas et al. |

OTHER PUBLICATIONS

Office Action mailed Mar. 26, 2010 for U.S. Appl. No. 12/242,224 (17 pages).
Office Action mailed Mar. 29, 2010 for U.S. Appl. No. 12/242,230 (11 pages).
Office Action mailed Apr. 29, 2010 for U.S. Appl. No. 12/343,728 (21 pages).
Office Action mailed May 11, 2010 for U.S. Appl. No. 12/345,490 (12 pages).
F.K. Liotopoulos et al., "A Modular, 160 Gbps ATM Switch Architecture for Multimedia Networking Support, based on a 3-Stage Clos Network," Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.
William J. Daily, "Virtual-Channel Flow Control," IEEE Transactions on Parallel and Distributed Systems, vol. 3, No. 2, Mar. 1992, pp. 194-205.
U.S. Appl. No. 12/345,490, filed Dec. 29, 2008, entitled "Flow-Control in a Switch Fabric" (38 pgs).
U.S. Appl. No. 12/646,114, filed Dec. 23, 2009, entitled "Methods and Apparatus for Tracking Data Flow Based on Flow State Values" (50 pgs).
U.S. Appl. No. 12/771,413, filed Apr. 30, 2010, entitled "Methods and Apparatus for Flow Control Associated with a Switch Fabric" (44 pgs).
U.S. Appl. No. 12/820,797, filed Jun. 22, 2010, entitled "Methods and Apparatus for Virtual Channel Flow Control Associated with a Switch Fabric" (54 pgs).

* cited by examiner

FIBRE CHANNEL CREDIT-BASED LINK FLOW CONTROL OVERLAY ONTO FIBRE CHANNEL OVER ETHERNET

BACKGROUND

Some embodiments described herein relate generally to flow control within a network, such as, for example, methods and apparatus for Fibre Channel over Ethernet credit-based flow control.

Known network solutions often employ a mix of Ethernet- and Fibre Channel-based switching to transmit frames among network devices such as application and storage servers. In many such known network solutions, Ethernet is employed for the routing of TCP/IP-based application server information, while Fibre Channel is employed by components of storage area networks (SANs). This use of two distinct protocols, however, typically involves distinct switching hardware for each, producing substantial hardware, energy and heat footprints at larger network centers, such as corporate datacenters. To reduce these inefficiencies, the Fibre Channel over Ethernet (FCoE) protocol was developed, allowing Fibre Channel frame information to be encapsulated within Ethernet frames and thus enabling a single hardware device (known as a Certified Network Adapter, or "CNA") to exchange information using either or both protocols. The FCoE protocol further allows Fibre Channel information to be transmitted over an Ethernet physical layer.

Some known implementations of FCoE can be configured to use an Ethernet-, pause-based method of flow control within the network. In such scenarios, a receiver module transmits a pause signal to a transmission device when the receiver module's intake buffer has reached capacity. Due to the latency inherent in transmitting this pause signal, however, the receiver module's buffer can be overwhelmed by data transmitted by the transmission device after buffer capacity has been reached but before the transmission device has received the pause signal—a phenomenon known as reaching the "bandwidth-delay cliff".

Because such occurrences are relatively rare when network traffic travels relatively short distances from node to node, this limitation of pause-based flow control is often an acceptable solution for single-site datacenters. When network devices are connected over longer distances, however, the resulting greater pause-signal latency results in a correspondingly greater amount of data being transmitted by the transmission device in the intervening time period—making a recipient device's buffer much more likely to overflow, and thus much more likely to drop frames. Under such circumstances, when congestion results, the receiver module is forced to drop additional frames as they arrive—resulting in data loss. Because accuracy-critical applications such as network storage prefer lossless data transmission, a need exists for methods and apparatus to implement flow control over an FCoE network in a manner that avoids dropped frames and thus data loss.

SUMMARY

In one embodiment, an apparatus includes an intake buffer module and a flow control module configured to define an available bits indicator, the available bits indicator representing a number of unallocated bits within the intake buffer module. The apparatus further includes a transceiver module configured to transmit, to a peripheral device, a credit update frame based at least in part on the available bits indicator. The transceiver module can be configured to receive a Fibre Channel over Ethernet (FCoE) frame from the peripheral device, a size of the FCoE frame being less than or equal to the number of unallocated bits. The apparatus can further include a switch fabric interface module operatively coupled to a plurality of switch fabric devices that define at least a portion of a switch fabric. The switch fabric interface module can be configured to define at least one cell based at least in part on the FCoE frame and further configured to transmit the at least one cell to at least one switch fabric device from the plurality of switch fabric devices.

DETAILED DESCRIPTION

Figure 1:
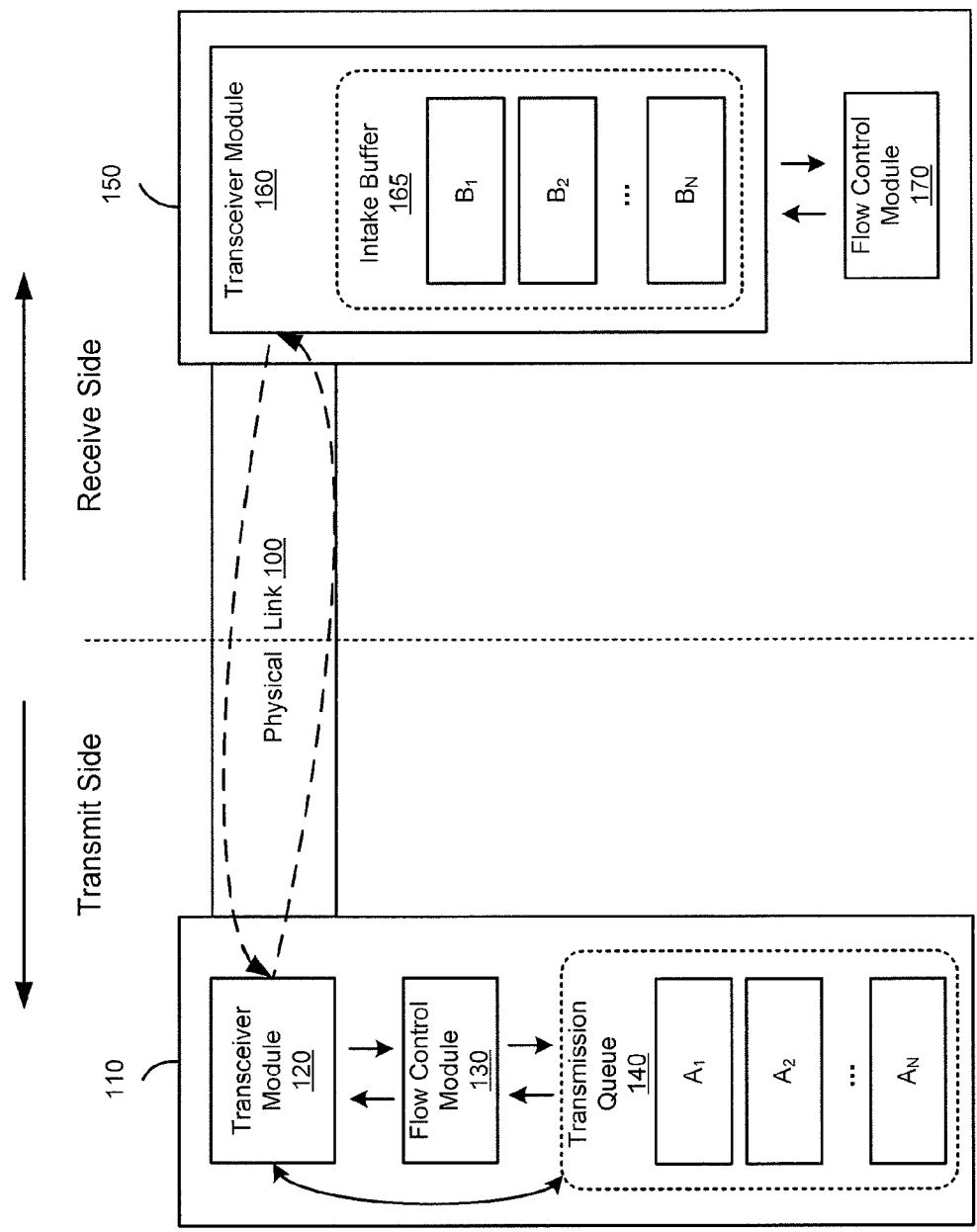
FIG. 1 is a schematic diagram that illustrates transmission and receiver modules configured to exchange data according to an FCoE credit-based flow control paradigm, according to an embodiment.

In some embodiments, a receiver module can be configured to transmit a Fibre Channel over Ethernet (FCoE) credit update frame to a transmission module. The transmission module can optionally be or be included in a peripheral processing device in a physical or logical computing network, i.e. a device situated at the logical and/or physical periphery of an entire network, such as a data center fabric. In some embodiments, the transmission module can be or be included in an "edge" device in a physical or logical computing network, i.e., a device situated at the logical and/or physical periphery of a switch fabric included in a network. The transmission module can be, for example, an application server, a network-based storage device, a database, etc. The receiver module can optionally be or be included in an "edge" device or a peripheral processing device. In some embodiments, the receiver module can transmit the FCoE credit update frame to the transmission module via a physical Ethernet link.

The FCoE credit update frame can include transmission credit information that indicates a number of bits that the transmission module is authorized to transmit to the receiver module. In some embodiments, the transmission credit information can be based at least in part on a current level of "fullness", or occupancy of an input buffer included in or coupled to the receiver module. For example, if the input buffer currently stores 35,000 bytes of data out of a total capacity of 65,536 bytes, the transmission credit information could indicate that the transmission module is authorized to transmit 30,536 bytes to the receiver module. In some embodiments, the transmission credit information could include a margin of extra allocated space and/or allocation for other transmission modules coupled to the receiver module.

In some embodiments, the transmission module can responsively define one or more FCoE data frames based at least in part on the transmission credit information. For example, in the hypothetical scenario described above, the transmission module could define one or more FCoE data frames with a total size of up to 30,536 bytes. In some embodiments, the transmission module can define the payload of each such FCoE data frame by populating at least a portion of the payload with data stored at a transmission queue. In some embodiments, regulation of the size of each FCoE frame defined and sent by the transmission module can be performed by a flow control module included in the transmission module.

In some embodiments, the receiver module can receive the one or more FCoE data frames at an intake buffer included in or coupled to the receiver module. The receiver module can update the transmission credit information associated with the transmission module based at least in part on the number of bytes received therefrom and/or a current fullness of the input buffer after receipt of the FCoE data frames.

In some embodiments, the receiver module can include one or more modules configured to define one or more cells that include at least a portion of payload data extracted from the FCoE data frames received from the transmission module. The one or more cells can then be sent by the receiver module across a switch fabric for later reassembly and/or reconversion into FCoE data frames for delivery to an end-point edge device and/or peripheral processing device.

In some embodiments, the receiver module can initiate exchange of FCoE frames with the transmission module by transmitting an FCoE credit negotiation frame. The FCoE credit negotiation frame can include, for example, initial transmission credit information and/or other information necessary to initiate FCoE communication between the receiver module and the transmission module. In some embodiments, the transmission module can define and transmit an FCoE credit recovery frame to the receiver module if the transmission module has not received an FCoE credit update frame from the receiver module for a predetermined amount of time. The FCoE credit recovery frame can request that the receiver module transmit a current or updated FCoE credit update frame to the transmission module.

FIG. 1 is a schematic diagram that illustrates transmission and receiver modules configured to exchange data using Fibre Channel over Ethernet (FCoE) credit-based flow control, according to an embodiment. More specifically, FIG. 1 illustrates a transmission module 110 in communication with a receiver module 150 via a physical link 100. The transmission module 110 and receiver module 150 each include transceiver modules 120 and 160, respectively, and flow control modules 130 and 170, respectively. The transmission module 110 includes a transmission queue 140 storing queued data $A_1 \ldots A_N$. The transceiver module 160 of receiver module 150 includes an input buffer 165.

The transmission module 110 can be any combination of hardware and/or software (executing on hardware) configured to transmit FCoE frames over an Ethernet connection, such as a wired or wireless Ethernet connection. For example, the transmission module 110 can be included in or constitute a server device, such as a computer server system running a known server operating system, such as Windows Server, Linux, etc. In such embodiments, the transmission module 110 can include at least a processor and a memory (not shown in FIG. 1). In some embodiments, the transmission module 110 can be a component of or be physically or operatively coupled to a data center system or data center switch fabric (not shown in FIG. 1), and can be optionally referred to as a "peripheral processing device". In some embodiments, the transmission module 110 can be or be included in an "edge" device in a physical or logical computing network, i.e., a device situated at the logical and/or physical periphery of a switch fabric included in a network. The transmission module 110 can optionally include application software and/or raw data exposed for access and/or use by other elements or components of a data center switch fabric. In some embodiments, the transmission module 110 can be a component of a storage area network (SAN) configured to provide data storage services for use by other elements and/or components of a data center fabric.

In some embodiments, the transmission module 110 can include a transceiver module 120, a flow control module 130 and/or a transmission queue 140. The transceiver module 120 can be any hardware-based module and/or software-based module (executing on hardware) configured to transmit data to and receive data from another device, such as receiver module 150. The transceiver module 120 can be configured to transmit and/or receive data via a wired and/or wireless Ethernet link such as the physical link 100. In some embodiments, the transceiver module 120 can include a Converged Network Adapter (CNA) device capable of transmitting and receiving Ethernet, FCoE and/or Fibre Channel frames. In some embodiments, the transceiver module 120 can include a hardware network interface card (NIC) capable of transmitting and receiving Ethernet and/or FCoE frames. The transceiver module 120 can be in communication with and configured to exchange flow control and/or transmission credit information with the flow control module 130. The transceiver module 120 can receive queued data, such as data $A_1$, from transmission queue 140 for inclusion in one or more transmitted Ethernet or FCoE frames.

The flow control module 130 can be a hardware-based module and/or software-based module (executing on hardware) configured to define an outgoing frame size based at least in part on transmission credit information. The flow control module 130 can be in communication with and configured to exchange flow control and/or credit-related information with the transceiver module 120. The flow control module 130 can be in communication with and configured to receive the queued transmission data from transmission queue 140.

The transmission queue 140 can be a hardware-based module and/or software-based module (executing on hardware) configured to store outgoing data queued for transmission to another device, such as the queued data $A_1 \ldots A_N$. In some embodiments, the transmission queue 140 can transmit a portion of the queued data based on a last-in/first-out (LIFO) order, a first-in/first-out (FIFO) order, or other rule or order. The transmission queue 140 can be configured to transmit at least a portion of the queued data to the flow control module 130 and/or the transceiver module 120.

The receiver module 150 can be any combination of hardware and/or software (executing on hardware) configured to receive FCoE frames over an Ethernet connection, such as a wired or wireless Ethernet connection. For example, the receiver module 150 can be included in or constitute a server device, such as a computer server system running a known server operating system, such as Windows Server, Linux, etc. In such embodiments, the receiver module 150 can include at least a processor and a memory (not shown in FIG. 1). In some embodiments, the receiver module 150 can be a component of or be physically or operatively coupled to a data center system or data center fabric (not shown in FIG. 1). In such embodiments, the receiver module 150 can be included in a data center component that receives information from one or more transmission devices and transmits data to one or more components of a switch fabric (not shown in FIG. 1), such as a multi-stage switch fabric. In such embodiments, the receiver module 150 can optionally be referred to as an "edge device". In some embodiments, the receiver module 150 can be a component of or be physically or operatively coupled to a data center system or data center switch fabric, and can be optionally referred to as a "peripheral processing device".

In FIG. 1, the receiver module 150 includes the transceiver module 160, which includes the intake buffer 165 and/or the flow control module 170. The transceiver module 160 can be any hardware-based module and/or software-based module (executing on hardware) configured to transmit data to and receive data from another device, such as the receiver module 150. The transceiver module 160 can be configured to transmit and/or receive data via a wired and/or wireless Ethernet link such as the physical link 100. In some embodiments, the transceiver module 160 can include a hardware network interface card (NIC) capable of transmitting and receiving Ethernet and/or FCoE frames. The transceiver module 160 can be in communication with and configured to exchange flow control and/or credit-related information with the flow control module 170.

The transceiver module 160 can include an intake buffer 165. The intake buffer 165 can be a hardware-based module and/or software-based module (executing on hardware) configured to receive and at least temporarily store data received by transceiver module 160. In some embodiments, the intake buffer 165 can be operatively or physically connected to one or more other hardware and/or software modules (executing on hardware) included in receiver module 150 (not shown in FIG. 1). In such embodiments, the one or more other hardware and/or software modules (executing on hardware) can access information stored in the intake buffer 165 for their own use and/or processing.

The flow control module 170 can be a hardware-based module and/or software-based module (executing on hardware) configured to define one or more transmission credits for one or more devices currently transmitting data to receiver module 150. The flow control module 170 can be in communication with and configured to exchange flow control and/or transmission credit information with the transceiver module 160.

In some embodiments, the transceiver module 120 can receive an FCoE credit negotiation and/or FCoE credit update frame from the receiver module 150 via the physical link 100. The FCoE credit negotiation frame can define one or more parameters, protocols, or other definitions so as to initialize an exchange of FCoE frames between transmission module 110 and receiver module 150. For example, the FCoE credit negotiation frame can include addressing information of the receiver module 150, an estimated time interval at which the transmission module 110 can anticipate receipt of an FCoE credit update frame from the receiver module 150, etc.

Each of the FCoE credit negotiation frame and the FCoE credit update frame can include FCoE transmission credit information that specifies a number of bytes that the receiver module 150 has allocated for receipt from the transmission module 110. In some embodiments, the transmission credit indicator can specify a number of bytes that the transceiver module 120 can transmit to the receiver module 150 within a specified period of time. In some embodiments, the transmission credit information can specify a number of total bytes that the transceiver module 120 can transmit via a combination of one or more FCoE data frames. In some embodiments, the transmission credit indicator can specify a number of bytes that each FCoE data frame sent by the transmission module 110 can contain or comprise.

The transceiver module 120 can transmit one or more FCoE data frames to the receiver module 150 via the physical link 100. The one or more FCoE data frames can optionally be defined by the transceiver module 120 based at least in part on transmission credit information included in a received FCoE credit negotiation or FCoE credit update frame as described above. In some embodiments, the transceiver module 120 can define the one or more FCoE data frames based at least in part on information received from the flow control module 130 and/or a portion of the queued data $A_1 \ldots A_N$ received from the transmission queue 140. For example, the transceiver module 120 can define the one or more FCoE data frames such that the total size in bytes of the one or more FCoE data frames does not exceed the number of bytes indicated by the transmission credit information. The transceiver module 120 can optionally further define the FCoE data frames to include header and payload information. In some embodiments, the header information can include addressing information of the receiver module 150. The payload information can be based at least in part on a portion of the queued data $A_1 \ldots A_N$ received from the transmission queue 140 as described above.

Alternatively, the transceiver module 120 can receive the one or more FCoE data frames from the flow control module 130. In such embodiments, the flow control module 130 can define the one or more FCoE data frames based at least in part on the transmission credit information described above and a portion of the queued data $A_1 \ldots A_N$ received from the transmission queue 140. The flow control module 130 can also direct the transmission of FCoE data frames by the transceiver module 120. For example, the flow control module 130 can direct the transceiver module 120 to transmit one or more FCoE data frames subject to a transmission schedule or responsive to one or more indicators, such as an indicator of a current network traffic level on the physical link 100.

In some embodiments, the transceiver module 160 can be configured to receive one or more FCoE data frames from one or more transmission modules, such as the transmission module 110. The transceiver module 160 can receive the FCoE data frames via a wired and/or wireless Ethernet link, such as the physical link 100. The transceiver module 160 can store each received FCoE data frame in or at the intake buffer 165, occupying the memory that defines the intake buffer 165. As successive FCoE data frames are received by the transceiver module 160 and stored at the intake buffer 165, the intake buffer 165 can reach varying degrees of "fullness". This measure of "buffer fullness" can be based at least in part on the rate at which received FCoE data frames are stored in the intake buffer 165 and/or the rate at which such frames are sent from the intake buffer 165 to another module or device (thereby de-occupying the corresponding bytes in the buffer).

In some embodiments, the flow control module 170 can define a transmission credit for a transmission module or device based at least in part on a current fullness or occupancy of the intake buffer 165. For example, the flow control module 170 can receive an indication of a current state of the intake buffer 165 via the transceiver module 160. The flow control module 170 can then define a transmission credit based on one or more factors, such as, for example: a current fullness of the intake buffer 165, available and/or total bandwidth on the physical link 100, a physical distance between the transmission module 110 and the receiver module 150, etc. In some embodiments, the flow control module 170 can then transmit an indicator of the transmission credit amount to the transceiver module 160.

Upon receipt of a transmission credit indicator from the flow control module 170, the transceiver module can 160 define an FCoE credit negotiation frame or an FCoE credit update frame. If a data exchange session has not been established between the receiver module 150 and a transmission module or device (such as transmission module 110), the transceiver module 160 can define an FCoE credit negotiation frame according to the characteristics described above in connection with the transceiver module 120. Alternatively, if a data exchange session has been established between the receiver module 150 and the transmission module 110, the transceiver module 150 can define an FCoE credit update frame according to the characteristics described above in connection with the transceiver module 120. In some embodiments, the FCoE credit negotiation and FCoE credit update frames can each include addressing information associated with the transmission module 110 in addition to transmission credit information based on the transmission credit indicator. Alternatively, the flow control module 170 can define the FCoE credit negotiation and/or FCoE credit update frames described above, and transmit the same in predefined form to the transceiver module 160.

After receiving a predefined FCoE credit negotiation or FCoE credit update frame from the flow control module 170, or defining the FCoE credit negotiation or FCoE credit update frame itself, the transceiver module 160 can transmit the FCoE credit negotiation or the FCoE credit update frame to the transmission module 110 via the physical link 100. In this manner, the receiver module 150 can regulate the amount of data sent by the transceiver module 120 based on a current level of fullness of the intake buffer 165. By so doing, the receiver module 150 can avoid receiving more bytes of data from the transmission module 110 than are available for occupancy or storage at the intake buffer 165, thereby avoiding buffer overflow and/or frame loss.

Figure 2:
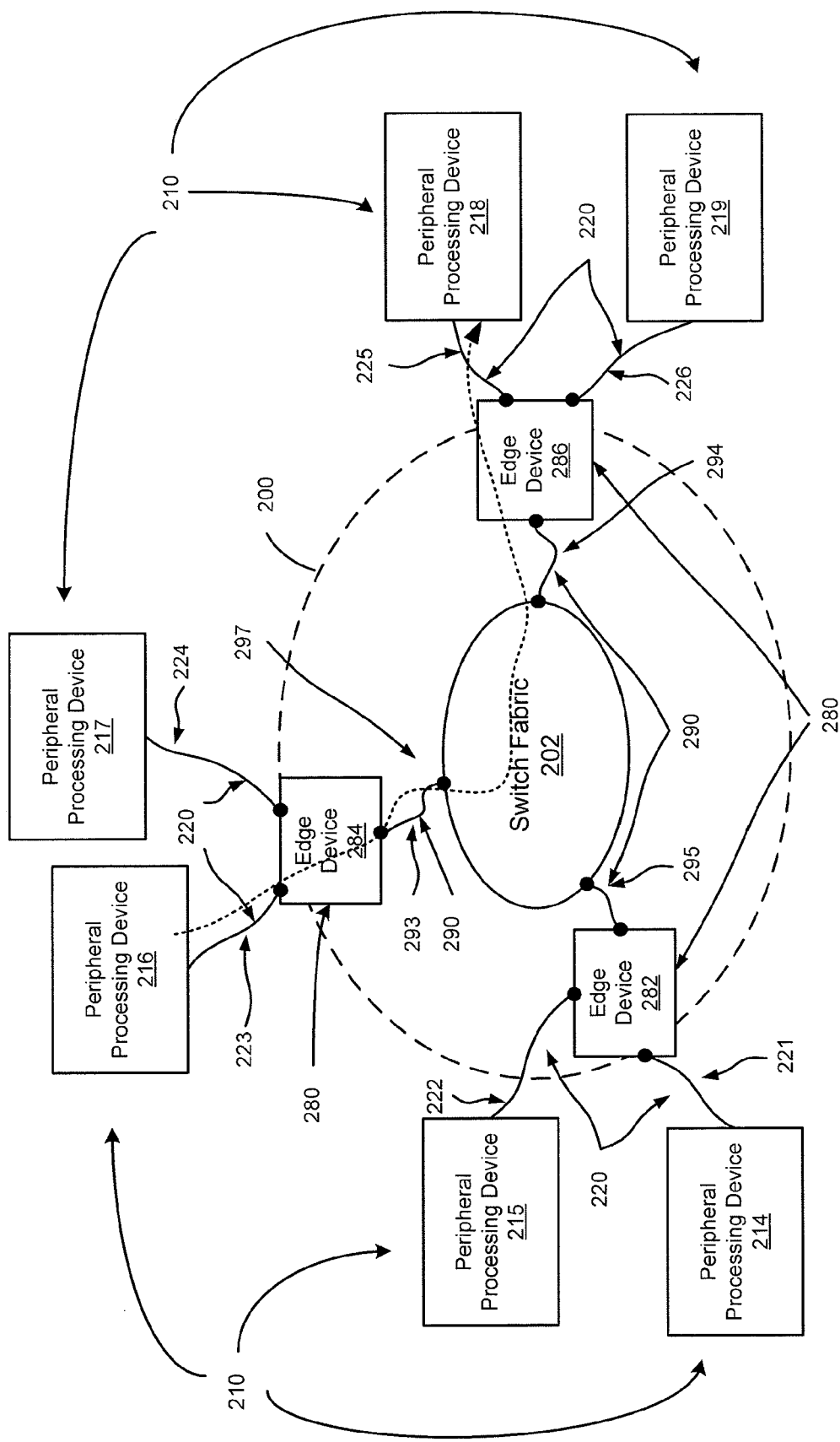
FIG. 2 is a schematic diagram that illustrates a data center including a switch fabric, multiple edge devices and multiple peripheral processing devices, according to an embodiment.

FIG. 2 is a schematic diagram that illustrates a data center including a switch fabric, multiple edge devices and multiple peripheral processing devices, according to an embodiment. The data center 200 includes edge devices 282, 284 and 286 (collectively referred to as edge devices 280), which are each in communication with a switch fabric 202 via at least one of edge physical links 293, 294 and 295 (collectively referred to as edge physical links 290). The edge devices 280 are each in communication with one or more of peripheral devices 214, 215, 216, 217, 218 and 219 (collectively referred to as peripheral devices 210) via at least one of peripheral physical links 221, 222, 223, 224, 225 and 226 (collectively referred to as peripheral physical links 220).

As shown in FIG. 2, the edge devices 280 are at the edges of the data center 200 and function as gateways to the peripheral processing devices 210. In some embodiments, the peripheral processing devices 210 can each be or represent, for example, a single server device, a virtual network, a local area network (LAN), a wide area network (WAN), and/or a storage area network (SAN), and can each include one or more wired and/or wireless segments.

The switch fabric 202 of the data center 200 can be a switch fabric that has multiple stages (e.g., an ingress stage, an egress stage, a middle stage) through which data can be routed. In some embodiments, the switch fabric 202 can be defined based on a Clos network architecture (e.g., a non-blocking Clos network, a strict sense non-blocking Clos network, a Benes network). In some embodiments, a network architecture such as, for example, a Clos network and/or a Benes network can be reconfigurable (e.g., rearrangeable). In some embodiments, the switch fabric 202 can be defined by one or more multi-stage switches (not shown) that each include one or more switch fabrics. In some embodiments, the switch fabric 202 can be configured to function as a single logical entity.

The edge devices 280 can each be configured to transmit data to and/or receive data from one or more of the peripheral processing devices 210. For example, the edge device 282 can receive data from the peripheral processing device 214 via the peripheral physical link 221, and in such instances, the edge device 282 can be referred to as a receiver disposed on a receive side of the peripheral physical link 221. Conversely, the edge device 282 can also be configured to transmit the data as a transmitter to the peripheral processing device 214 via the peripheral physical link 221.

Flow of data via each of the peripheral physical links 220 can be controlled based on one or more credit-based flow control loops such as those described in connection with FIG. 1 (and FIGS. 5 and 6 discussed below). The credit-based flow control loops can be associated with the physical links 220 and one or more queues within a single peripheral processing device from the peripheral processing devices 210 and/or a single edge device from the edge devices 280. For example, at least one credit-based flow control loop can be associated with the peripheral physical link 221, the peripheral processing device 214 and the edge device 282.

In some embodiments, each credit-based flow control loop can have a first queue on one side (e.g., a transmit side) of a peripheral physical link from peripheral physical links 220 and a second queue on another side (e.g., a receive side) of that same peripheral physical link. For example, although not shown, a first queue can be included in the peripheral processing device 214 on one side of the peripheral physical link 221, and a second queue can be included in the edge device 282 on another side of the peripheral physical link 221. A credit-based flow control loop can be associated with the first queue included in the peripheral processing device 214 and the second queue within the edge device 282.

A flow control module associated with the second queue (the receive queue) can calculate a transmission credit associated with the first queue (the transmit queue) based at least in part on a measure of fullness of the second queue. The flow control module associated with the second queue can transmit a credit update frame including the transmission credit to the peripheral processing device 214 via the peripheral physical link 221. The first queue can be identified within the credit update frame based on a queue identifier associated with the first queue.

A flow control module associated with the first queue (the transmit queue) can define a data frame, the size of the data frame being based at least in part on the transmission credit included in the credit update frame and information stored in the first queue. The peripheral processing device 214 can then transmit the data frame to the second queue associated with edge device 282 via the edge physical link 221.

An edge device from the edge devices 280, such as the edge device 284, can be configured to transmit data to and/or receive data from the switch fabric 202 via an edge physical link from the edge physical links 290, such as the edge physical link 293. For example, the edge device 284 can transmit data via the edge physical link 293, and the edge device 284 can be referred to as a transmitter disposed on a transmit side of the edge physical link 293. The switch fabric 202 can be configured to receive the data and can be referred to as a receiver disposed on a receive side of the edge physical link 293. Conversely, the switch fabric 202 can also be configured to transmit data as a transmitter, and the edge device 284 can be configured to receive the data as a receiver.

As shown in FIG. 2, one or more portions of data can follow a data path 297 to travel from a first peripheral processing device, such as the peripheral processing device 216, to a second peripheral processing device, such as the peripheral processing device 218. More specifically, the peripheral processing device 216 can first transmit the data from a first (transmit) queue associated therewith to a second (receive) queue associated with the edge device 284. In some embodiments, the flow of the transmitted data from the peripheral processing device 216 can be based at least in part on a transmission credit associated with the first queue, the transmission credit being defined by a flow control module associated with the edge device 284. The edge device 284 can then define one or more cells based at least in part on the received data, and transmit the cells to the switch fabric 202 as discussed in connection with FIG. 3 below. In some embodiments, one or more devices included in the switch fabric 202 can transmit the cells to a third (receive) queue associated with the edge device 286. The edge device 286 can then transmit data included in or extracted from at least one cell, via a fourth (transmit) queue, to a fifth (receive) queue associated with the peripheral processing device 218.

Figure 3:
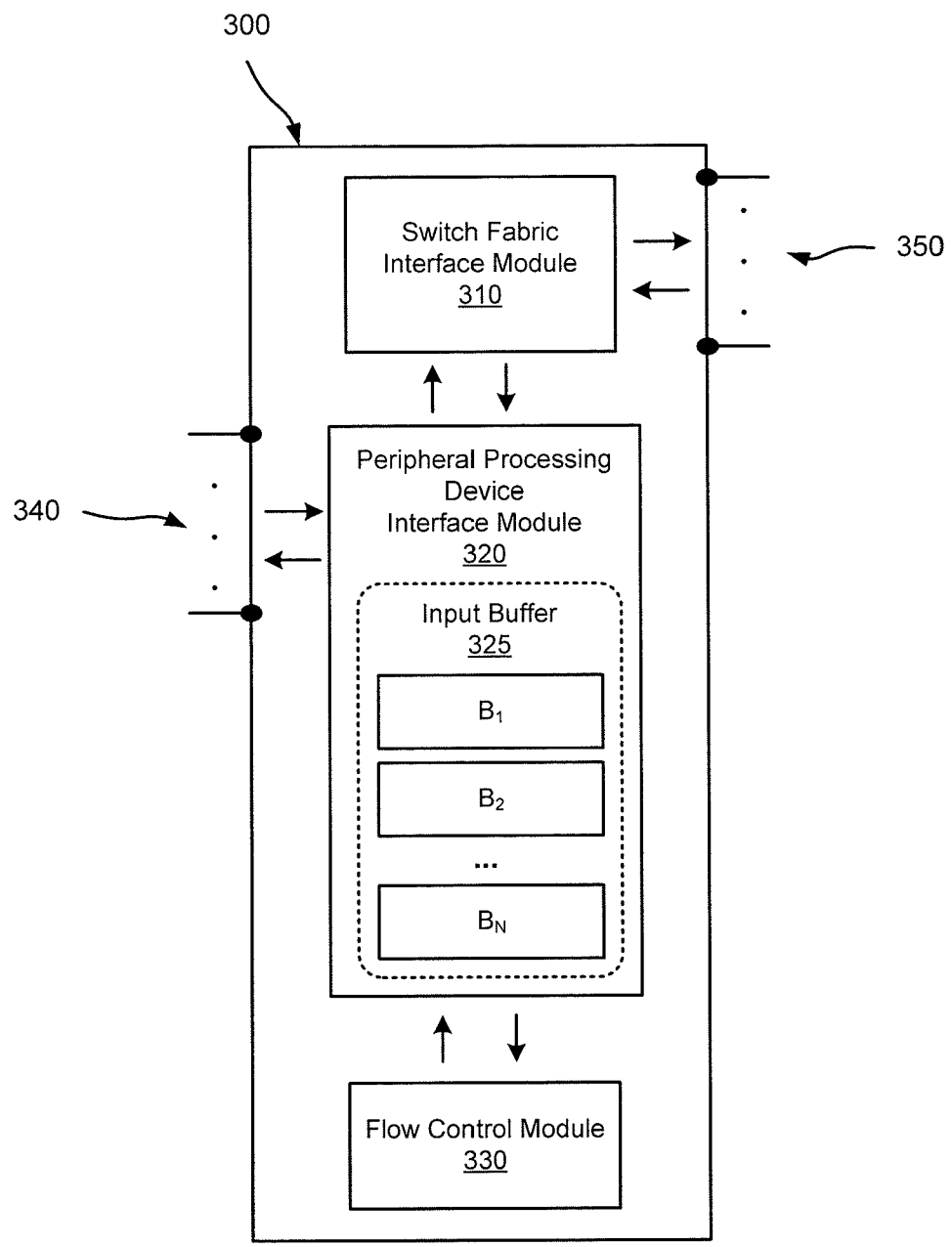
FIG. 3 is a schematic diagram that illustrates an FCoE credit-based flow-control-enabled edge device, according to an embodiment.

FIG. 3 is a schematic diagram that illustrates an FCoE credit-based flow-control-enabled edge device, according to an embodiment. More specifically, FIG. 3 illustrates an edge device 300 that includes a switch fabric interface module 310, a peripheral processing device interface module ("peripheral interface module") 320 that includes an input buffer 325, a flow control module 330 and communication modules 340 and 350. The switch fabric interface module 310 can be in communication with the peripheral interface module 320, and/or with a switch fabric (not shown in FIG. 3) via the communication module 350. The peripheral interface module 320 can be in communication with the flow control module 330, and with a network device, such as an "edge" device (not shown in FIG. 3), via the communication module 340. The flow control module 330 can be in communication with the peripheral interface module 320.

The edge device 300 can be any combination of hardware and/or software configured to receive FCoE frames over an Ethernet connection, such as a wired or wireless Ethernet connection. In some embodiments, the edge device 300 can include at least a processor and a memory (not shown in FIG. 3). In some embodiments, the edge device 300 can be included in or comprise a server device, such as a computer server system running a known server operating system, such as Windows Server, Linux, etc. The edge device 300 can be a component of or be physically or operatively coupled to a data center system or data center fabric as shown in FIG. 2. In such embodiments, the edge device 300 can receive information from one or more peripheral processing devices and transmit data to one or more components of a switch fabric (not shown in FIG. 3), such as components of a multi-stage switch fabric.

The switch fabric interface module 310 can be any combination of hardware and/or software (executing on hardware) configured to exchange information with a switch fabric, such as a multi-stage switch fabric housed in a data center. In some embodiments, the switch fabric module 310 can receive data from the input buffer 325 of the peripheral interface module 320 and organize at least a portion of the received data into one or more cells. Additional information related to the definition, formulation and transmission of such cells is discussed in U.S. patent application No. 12/558,130, now U.S. Pat. No. 8,340,088, filed Sep. 11, 2009, and entitled "Methods and Apparatus Related to a Low Cost Data Center Architecture".

In such embodiments, the switch fabric interface module 310 can transmit the one or more cells to the switch fabric via the communication module 350. The switch fabric interface module 310 can optionally include an output buffer or queue (not shown in FIG. 3) that stores the one or more cells prior to their transmission via the communication module 350.

In some embodiments, the switch fabric interface module 310 can receive one or more cells from a switch fabric via the communication module 350. In such embodiments, the switch fabric interface module 310 can "unpack" or extract data included in the one or more received cells and transmit the extracted data to the peripheral interface module 320 for further processing. The further processing can include, for example, reformatting, repackaging and/or transmission of at least a portion of the extracted data to a peripheral device via the communication module 340.

The peripheral interface module 320 can be any combination of hardware and/or software (executing on hardware) configured to exchange data with a peripheral device, such as the peripheral devices discussed in connection with FIG. 2 above. In some embodiments, the peripheral interface module 320 can exchange data with a peripheral device according to a credit-based flow control model. The credit-based flow control model can optionally be an FCoE credit-based flow control model or protocol. In such embodiments, the peripheral interface module 320 can receive transmission credit information for each of one or more peripheral devices from the flow control module 330. The peripheral interface module 320 can optionally define an FCoE credit negotiation frame and/or an FCoE credit update frame for each such peripheral device, each such frame including at least transmission credit information associated with that peripheral device. In some embodiments, the peripheral interface module 320 can transmit the FCoE credit negotiation and/or FCoE credit update frame to the appropriate peripheral device(s) via the communication module 340. In some embodiments, an FCoE credit negotiation frame can be sent by the peripheral interface module 320 to a peripheral device via the communication module 340 to initialize data exchange. The FCoE credit negotiation frame can optionally include an operation or "op" code indicating that the frame is an FCoE credit negotiation frame. In some embodiments, an FCoE credit update frame can be sent subsequent to initialization of data exchange between a peripheral device and the peripheral interface module 320. The FCoE credit update frame can optionally include an operation or "op" code indicating that the frame is an FCoE credit update frame.

The input buffer 325 can be any combination of hardware and/or software (executing on hardware) configured to receive and store incoming data. In some embodiments, the input buffer 325 can be a buffer or queue construct or module that receives, via the communication module 340, data frames transmitted by a peripheral processing device. In some embodiments, the input buffer 325 can indicate a level of its occupancy or "fullness" to the flow control module 330 in response to a query. This "fullness" information can be used by the flow control module 330 in calculating one or more transmission credits associated with one or more peripheral devices.

The flow control module 330 can be any valid combination of hardware and/or software (executing on hardware) configured to manage data flow to the edge device 300 from one or more peripheral processing or other devices. In some embodiments, the flow control module 330 can define one or more transmission credits for one or more peripheral processing devices currently in communication with the edge device 300. Each transmission credit can be calculated and/or defined based at least in part on the current "fullness", or percentage of occupied bits, within the input buffer 325. The value of a transmission credit associated with a particular peripheral processing device can optionally change over time as, for example, the edge device 300 receives additional data from one or more peripheral devices via the communication module 340 and stores the data in input buffer 325—thereby changing the occupancy level of the input buffer 325. In some embodiments, the flow control module 330 can receive input buffer fullness information from the input buffer 325 in response to a periodic query. Alternatively, the flow control module 330 can receive input buffer fullness information from the input buffer 325 on a periodic basis, such as every one millisecond. In some embodiments, the flow control module 330 can receive input buffer fullness information from the input buffer 325 upon the occurrence of a predefined event, such as when the input buffer 325 reaches a threshold level (e.g., 80% full).

The communication modules 340 and 350 can each be a combination of hardware and/or software (executing on hardware) configured to transmit and receive data across a network. For example, in some embodiments the communication modules 340 and 350 can each include an Ethernet network interface card (NIC), Fibre Channel network adapter configured to transmit and receive Fibre Channel data to and from a switch fabric, and/or a Converged Network Adapter (CNA) configured to exchange both Fibre Channel and Ethernet frames.

Figure 4A:
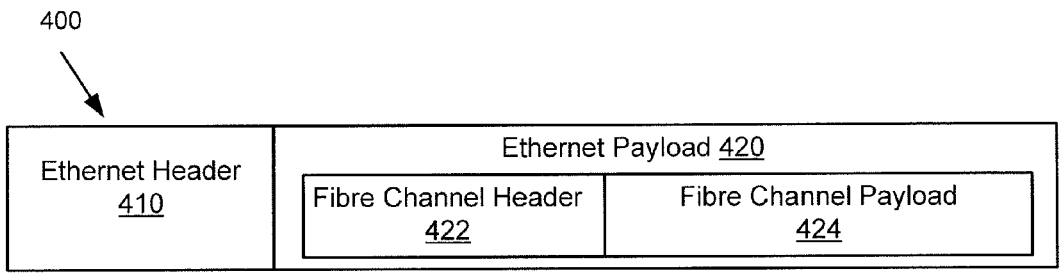
FIG. 4A is a schematic diagram that illustrates an FCoE frame, according to an embodiment.

FIG. 4A is a schematic diagram that illustrates an FCoE frame, according to an embodiment. More specifically, FIG. 4A illustrates the first two hierarchical levels of an FCoE frame 400. In the figure, the FCoE frame 400 includes an Ethernet header 410 and an Ethernet payload 420. The Ethernet payload 420 includes a Fibre Channel Header 422 and a Fibre Channel Payload 424. The Ethernet header 410 can include Media Access Control ("MAC") address information. In some embodiments, the Ethernet header 410 can include source MAC address information and destination MAC address information (not shown in FIG. 4A). The source MAC address information and the destination MAC address information can enable one or more communication modules or network adapters coupled to a source network device and a destination network device to identify one another on and exchange information across a network.

In some embodiments, the FCoE frame 400 can be an FCoE credit update frame (as discussed in connection with FIG. 4B below). In such embodiments, the FCoE frame 400 can be defined and sent by a receiver device to a transmission device within an Ethernet-compatible portion of a network, such as a portion of a data center fabric (not shown in FIGS. 4A-4C). It should be noted that although a "transmission device" transmits FCoE data frames to a receiver device, the transmission device is a recipient of FCoE credit negotiation and FCoE credit update frames. Accordingly, while a "receiver device" receives FCoE data frames from a transmission device, the receiver device transmits FCoE credit negotiation and FCoE credit update frames to the transmission device to regulate the flow of transmitted data therefrom.

In some embodiments, the transmission device can be a peripheral processing device as described in connection with FIG. 2 above. In some embodiments, the receiver device can be an edge device as described in connection with FIGS. 2 and 3 above. The transmission device and receiver device can each include one or more network adapters, such as, for example, a converged network adapter (CNA) configured to exchange both Fibre Channel and Ethernet network traffic, a Fibre Channel Network Adapter, and/or an Ethernet Network Interface Card (NIC). In some embodiments, the transmission device can include a CNA configured to encapsulate Fibre Channel frames within Ethernet frames (thereby defining FCoE frames), and the receiver device can include at least one Ethernet NIC configured to receive the FCoE frames from the transmission device's CNA.

In embodiments where the FCoE frame 400 is an FCoE credit update frame, the frame can be formatted and/or configured to indicate to a transmission device a number of bits that the transmission device is authorized to transmit to a receiver device. In some embodiments, the FCoE frame 400 can indicate a number of bits that the transmission device can transmit to the receiver device within a given period or duration of time and/or until a subsequent FCoE credit update frame is received by the transmission device. Alternatively, in some embodiments, the transmission credit information can indicate an increase or decrease in the number of allowed bits relative to a previous or initial number of bits, instead of a total number of allowed bits. In some embodiments, this number of bits can be referred to as transmission credit information.

In such embodiments where the FCoE frame 400 is an FCoE credit update frame, the source MAC address information can define or indicate an identity of a network adapter, such as an Ethernet NIC, operatively or physically coupled to the receiver device. In such embodiments, the destination MAC address information can define or indicate an identity of a network adapter, such as an Ethernet NIC or CNA, operatively or physically coupled to a transmission device (destination of the FCoE credit update frame).

In some embodiments, the FCoE frame 400 can be an FCoE data frame, as discussed in connection with FIG. 4C below. In such embodiments, the FCoE frame 400 can be formatted and/or configured to deliver a payload of data from a transmission device to a receiver device. In some embodiments, the transmission device can be a peripheral processing device, and the receiver device can be an edge device, as discussed above. In embodiments where the FCoE frame 400 is an FCoE data frame, the source MAC address information can define or indicate an identity of a network adapter, such as an Ethernet NIC or CNA, operatively or physically coupled to the source (transmission) device. In such embodiments, the destination MAC address information can define or indicate an identity of a network adapter, such as an Ethernet NIC, operatively or physically coupled to a receiver device (i.e., the destination of the FCoE data frame).

Figure 4B:
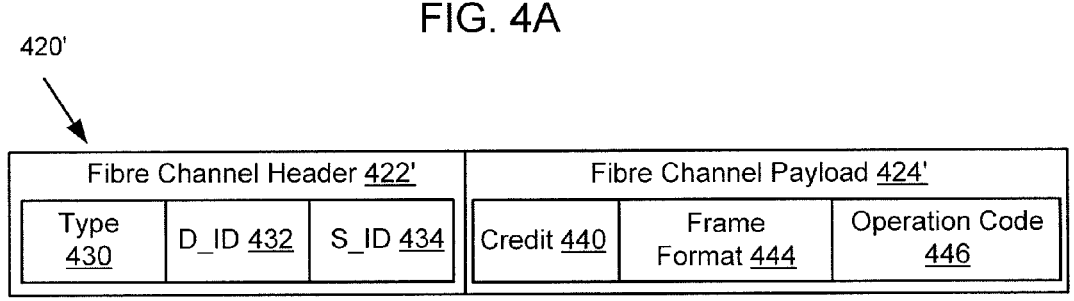
FIG. 4B is a schematic diagram that illustrates the Ethernet payload portion of an FCoE credit update frame, according to an embodiment.

FIG. 4B is a schematic diagram that illustrates an Ethernet payload portion of the FCoE frame 400 of FIG. 4A in an instance where the FCoE frame 400 is an FCoE credit update frame, according to an embodiment. (As such, for purposes of the discussion of FIG. 4B below, the FCoE frame will be referred to as "FCoE credit update frame"). More specifically, FIG. 4B illustrates an Ethernet payload portion 420 of the FCoE credit update frame that includes a Fibre Channel Header 422' and a Fibre Channel Payload 424'. The Fibre Channel Header 422' and the Fibre Channel Payload 424' can define a single Fibre Channel frame. The Fibre Channel Header 422' includes frame type information 430, credit update destination ID ("D_ID") information 432 and credit update source ID ("S_ID") information 434. The Fibre Channel Payload 424' includes transmission credit information 440, frame format information 444 and operation code information 446.

The Ethernet payload portion can be included in the FCoE credit update frame as discussed in connection with FIG. 4A above. In some embodiments, the Fibre Channel Header 422' and the Fibre Channel Payload 424' can be included within the Ethernet payload portion, thereby defining an encapsulated Fibre Channel frame.

In some embodiments, the Fibre Channel Header 422' can be an alternative or customized Fibre Channel header that contains the fields and/or information described above. The type information 430 can include information indicating a purpose or type of the FCoE frame in which the Fibre Channel Header 422' is encapsulated. For example, the type information 430 can include information indicating that the FCoE frame defined by the Fibre Channel Header 422' and the Fibre Channel Payload 424' is an FCoE credit update frame. In some embodiments, the type information 430 can include the vendor-unique value 0×CE to indicate that the FCoE frame is an FCoE credit update frame.

In some embodiments, the D_ID information 432 can specify a Fibre Channel address (FC_ID) of a virtual Fibre Channel port logically coupled to a network adapter (such as an Ethernet NIC or CNA) included in, operatively or physically coupled to, or in communication with a transmission device (i.e., a destination of the FCoE credit update frame 400). The S_ID information 434 can specify an FC_ID of a virtual Fibre Channel port logically coupled to a network adapter included in or operatively or physically coupled to a receiver device, such as an edge device (i.e., a source of the FCoE credit update frame 400). The D_ID information 432 and the S_ID Information 434 can each include a VN_Port, VF_Port or VE_Port identifier (not shown in FIG. 4B). In some embodiments, the VN_Port identifier can specify a virtual N_Port address, i.e., the FCoE/virtual identity of a Fibre Channel end node. In some embodiments, the VF_Port identifier can specify a virtual F_Port address, i.e., the virtual/FCoE identity of a Fibre Channel link attachment node, such as a Fibre Channel switch that connects to a Fibre Channel end node. In some embodiments, the VE_Port identifier can specify a virtual E_Port address, i.e., the virtual/FCoE identity of a Fibre Channel expansion node, such as a Fibre Channel switch that connects to another Fibre Channel switch or bridge device via an inter-switch link. Each of the VN_Port, VF_Port and VE_Port identifiers mentioned above can be referred to as virtual port identifiers to specify that each such port communicates via a non-Fibre Channel link, such as the FCoE Ethernet link described above.

In some embodiments, in FCoE credit update frames where the D_ID information 432 includes a VF_Port, the S_ID information 434 can include a VN_Port. In such embodiments, in FCoE credit update frames where the D_ID information 432 includes a VN_Port, the S_ID information 434 can include a VN_Port or a VF_Port. In instances where the D_ID information 432 includes a VE_Port, the S_ID information 434 can include a VE_Port.

In some embodiments, if the D_ID information 432 includes a VF_Port and/or a VE_Port identifier, the FC_ID specified by the D_ID information 432 can be a domain controller FC_ID for a Fibre Channel switch that owns the identified VF_Port or VE_Port. Likewise, if the S_ID information 434 includes a VF_Port identifier and/or a VE_Port identifier, the FC_ID specified by the S_ID information 434 can be a domain controller FC_ID for a Fibre Channel switch that owns the identified VF_Port or VE_Port. In some embodiments, if the D_ID information 432 includes a VN_Port identifier, the FC_ID specified by the D_ID information 432 can be the FC_ID of whichever port established a connection between that N (end) node and a VF_Port via the Fabric Login (FLOGI) Protocol. Likewise, if the S_ID information 432 includes a VN_Port identifier, the FC_ID specified by the D_ID information 434 can be the FC_ID of whichever port established a connection between that N (end) node and a VF_Port via the Fabric Login (FLOGI) Protocol. In some embodiments, each of the D_ID information 432 and the S_ID information 434 can be 24 bits in length.

The Fibre Channel Header 422' can further include routing control field ("R_CTL") information, originator exchange ID ("OX_ID") information and/or responder exchange ID ("RX_ID") information (not shown in FIG. 4B). In some embodiments, the R_CTL information can indicate an FCoE frame type. In some embodiments, the OX_ID information and the RX_ID information can be used to group a sequence of related Fibre Channel frames. In some embodiments, the value of one or more of the R_CTL information, the OX_ID information and/or the RX_ID information can be 0×00.

In some embodiments, the Fibre Channel Payload 424' can be an alternative Fibre Channel payload that includes the fields and/or information described above. The credit information 440 can include transmission credit information associated with a transmission device, such as a peripheral processing device as discussed in connection with FIGS. 1-3 above. In some embodiments, the credit information 440 can be represented or expressed in bytes, indicating a number of bytes allocated to the transmission device when transmitting data to a receiver device. In some embodiments, the credit information 440 can be comprised of and/or defined in four bytes. The frame format information 444 can include a revision level of the frame format associated with the FCoE credit update frame 400. In some embodiments, the frame format information 444 can be comprised of and/or defined in or by four bits. The operation code information 446 can include frame type information that indicates that the FCoE credit update frame 400 is, in fact, an FCoE credit update frame. In some embodiments, the operation code information 446 can indicate that the FCoE frame in which it is encapsulated is one of: an FCoE credit negotiation frame, an FCoE credit update frame, or an FCoE credit recovery frame (not shown in FIGS. 4A-4C).

Figure 4C:
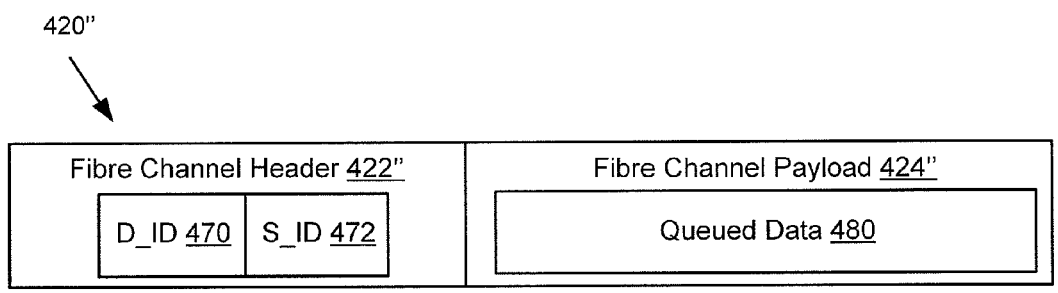
FIG. 4C is a schematic diagram that illustrates the Ethernet payload portion of an FCoE data frame, according to an embodiment.

FIG. 4C is a schematic diagram that illustrates the Ethernet payload portion of an FCoE frame 400 of FIG. 4A in an instance where the FCoE frame 400 is an FCoE data frame, according to an embodiment. (As such, for purposes of discussion of FIG. 4C below, FCoE frame will be referred to as "FCoE data frame"). More specifically, FIG. 4C illustrates an Ethernet payload portion 420" of the FCoE data frame 400 that includes a Fibre Channel Header 422" and a Fibre Channel Payload 424". The Fibre Channel Header 422" includes D_ID information 470 and S_ID information 472. The Fibre Channel Payload 424" includes queued data 480. The Ethernet payload portion 420 can be included in the FCoE data frame as discussed in connection with FIG. 4A above. In some embodiments, the Fibre Channel Header 422" and the Fibre Channel Payload 424" can be included within the Ethernet payload portion 420", defining an encapsulated Fibre Channel frame. In some embodiments, each of the D_ID information 470 and the S_ID information 472 can be 24 bits in length. In some embodiments, the Fibre Channel Header 422" can include additional fields associated with routing and/or other information, such as that as discussed in connection with FIG. 4B above.

In some embodiments, the S_ID information 470 can specify a Fibre Channel address (FC_ID) of a virtual Fibre Channel port logically coupled to a network adapter (such as an Ethernet NIC or CNA) included in, operatively or physically coupled to, or in communication with a transmission device. The S_ID information 472 can specify an FC_ID of a virtual Fibre Channel port logically coupled to a network adapter included in or operatively or physically coupled to a receiver device, such as an edge device. The D_ID information 470 and the S_ID information 480 can each include a VN_Port, VF_Port or VE_Port identifier as described in connection with FIG. 4B above.

In some embodiments, if the D_ID information 470 includes a VF_Port identifier, the S_ID information 472 can include a VN_Port identifier. In such embodiments, if the D_ID information 470 includes a VN_Port identifier, the S_ID information 472 can include a VN_Port identifier or a VF_Port identifier. In such embodiments, if the D_ID information 470 includes a VE_Port identifier, the S_ID information 472 can include a VE_Port identifier.

In some embodiments, the size in bytes of the Ethernet payload portion 420, the Fibre Channel Header 422, the Fibre Channel Payload 424 and/or the queued data 480 can be defined based at least in part on a transmission credit, such as the transmission credit information 440 described in connection with FIG. 4B above. In some embodiments, the queued data 480 can include any valid information expressed in bits, such as application information, storage area network (SAN) information, web page or e-mail information, etc.

Although not shown in FIGS. 4A-4C, in some embodiments the FCoE frame 400 can be an FCoE credit negotiation frame or an FCoE credit recovery frame. In such embodiments, an FCoE credit negotiation frame can initialize information exchange between a transmission device and a receiver device, such as a peripheral processing device and an edge device included in a data center fabric. In some embodiments, an FCoE credit recovery frame can be defined and sent by a transmission device to a receiver device when the transmission device has not received an FCoE credit update frame from the receiver device for a specified or predefined amount of time. In such embodiments, the FCoE credit recovery frame can instruct the receiver device to define and transmit an FCoE credit update frame as described above, and/or otherwise indicate the current state of the receiver device and/or an input buffer or queue associated with that receiver device.

Figure 5:
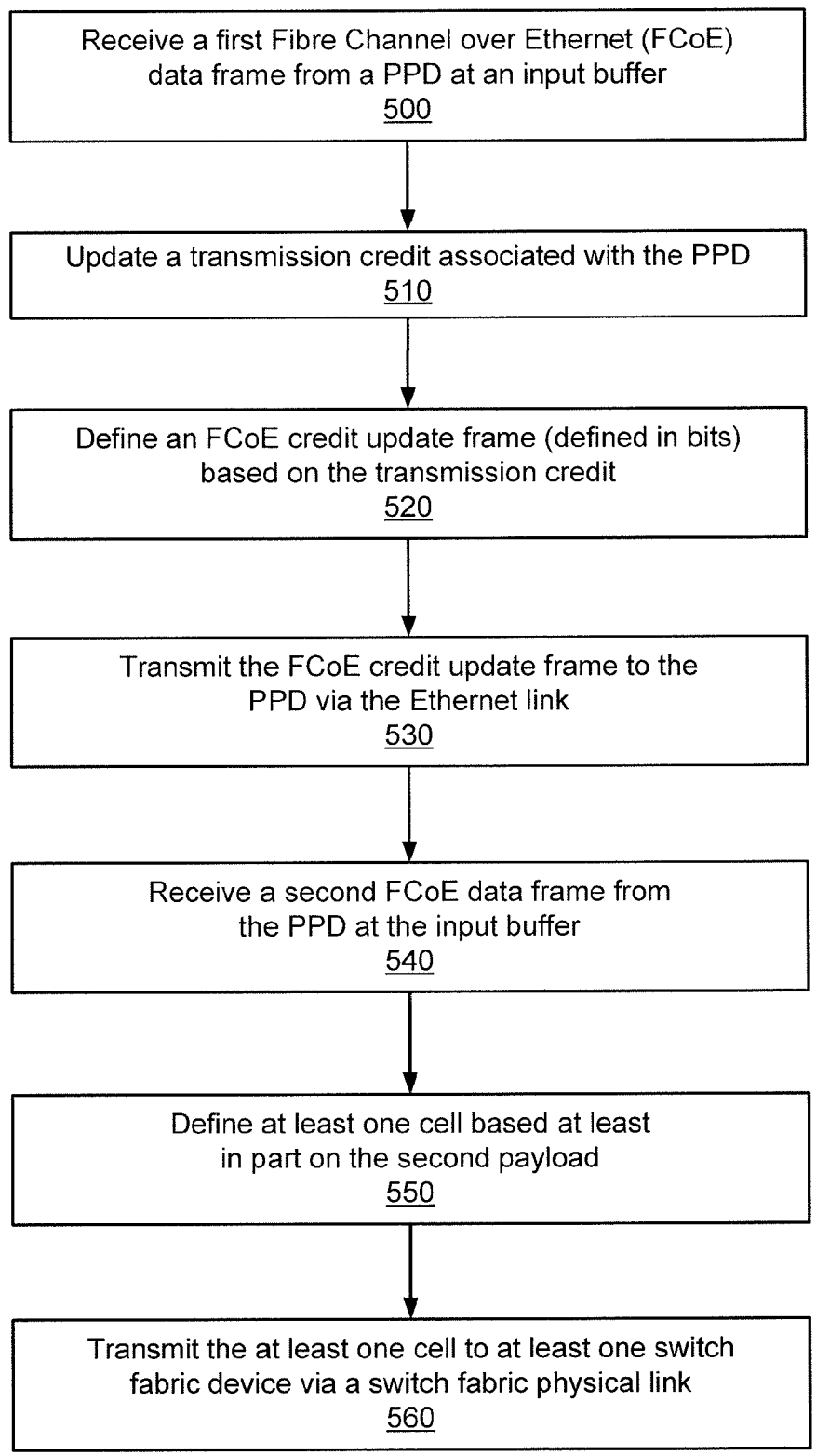
FIG. 5 is a flow chart that illustrates a method of receiving data at an edge device based on an FCoE credit-based flow control paradigm and transmitting at least a portion of the data to a portion of a switch fabric, according to an embodiment.

FIG. 5 is a flow chart that illustrates a method of receiving data at an edge device based on an FCoE credit-based flow control model and transmitting at least a portion of the data to a portion of a switch fabric, according to an embodiment.

An edge device can receive a first FCoE data frame from a peripheral processing device ("PPD") at an input buffer, 500. In some embodiments, the edge device can receive the first FCoE data frame via an Ethernet link, such as a wired/physical or wireless Ethernet link operatively and/or physically coupled to the edge device and the PPD. In some embodiments, the PPD can be a server device, a SAN device, etc. In some embodiments, the input buffer can receive the first FCoE data frame from a hardware- and/or software-based communication module operatively and/or physically coupled to both the input buffer and the Ethernet link.

A flow control module included in the edge device can update a transmission credit associated with the PPD, 510. In some embodiments, the transmission credit can be updated based at least in part on a number of bits included in the received first FCoE data frame, a number of unallocated bits within the input buffer and/or a change in the number of unallocated bits within the input buffer since a most-recent update or set of updates.

The flow control module included in the edge device can define an FCoE credit update frame that includes transmission credit information based on the transmission credit, 520. As described above, the transmission credit information can be defined in bits. In some embodiments, the flow control module can transmit the FCoE credit update frame to a communication module for transmission to the PPD.

The edge device can transmit the FCoE credit update frame to the PPD via the Ethernet link, 530. In some embodiments, a communication module included in the edge device can transmit the FCoE credit update frame to the PPD via the Ethernet link.

The edge device can receive a second FCoE data frame from the PPD at the input buffer, 540. The received second FCoE data frame can have a size in bits less than or equal to the transmission credit. In some embodiments, the edge device can receive the second FCoE frame via the Ethernet link described above. In some embodiments, the edge device can first receive the second FCoE frame at the communication module mentioned above, the communication module passing the second received FCoE data frame directly to the input buffer. In some embodiments, the input buffer can be included and/or disposed within the communication module itself such that Ethernet and/or FCoE frames received by the communication module need not be passed from the communication module to a separate input buffer.

The edge device can define at least one cell based at least in part on a payload of the received second FCoE frame, 550. For example, one or more modules included in the edge device can define a new cell that includes information included in the payload of the received second FCoE frame that has been requested by another device on the network, such as another peripheral processing device or server.

The edge device can transmit the at least one cell to at least one switch fabric device via a switch fabric physical link, 560. In some embodiments, the switch fabric physical link can be a Fibre Channel, Ethernet and/or FCoE link. In some embodiments, the edge device can transmit the at least one cell via a switch fabric communication module configured to exchange data with one or more switch fabric devices.

The edge device can optionally store information included in a payload of the received FCoE frames at a memory disposed within or physically or operatively coupled to the edge device. For example, in some embodiments, the edge device can store the first payload to a location on a hard drive and/or in volatile or non-volatile memory for subsequent use by one or more other applications or devices.

Figure 6:
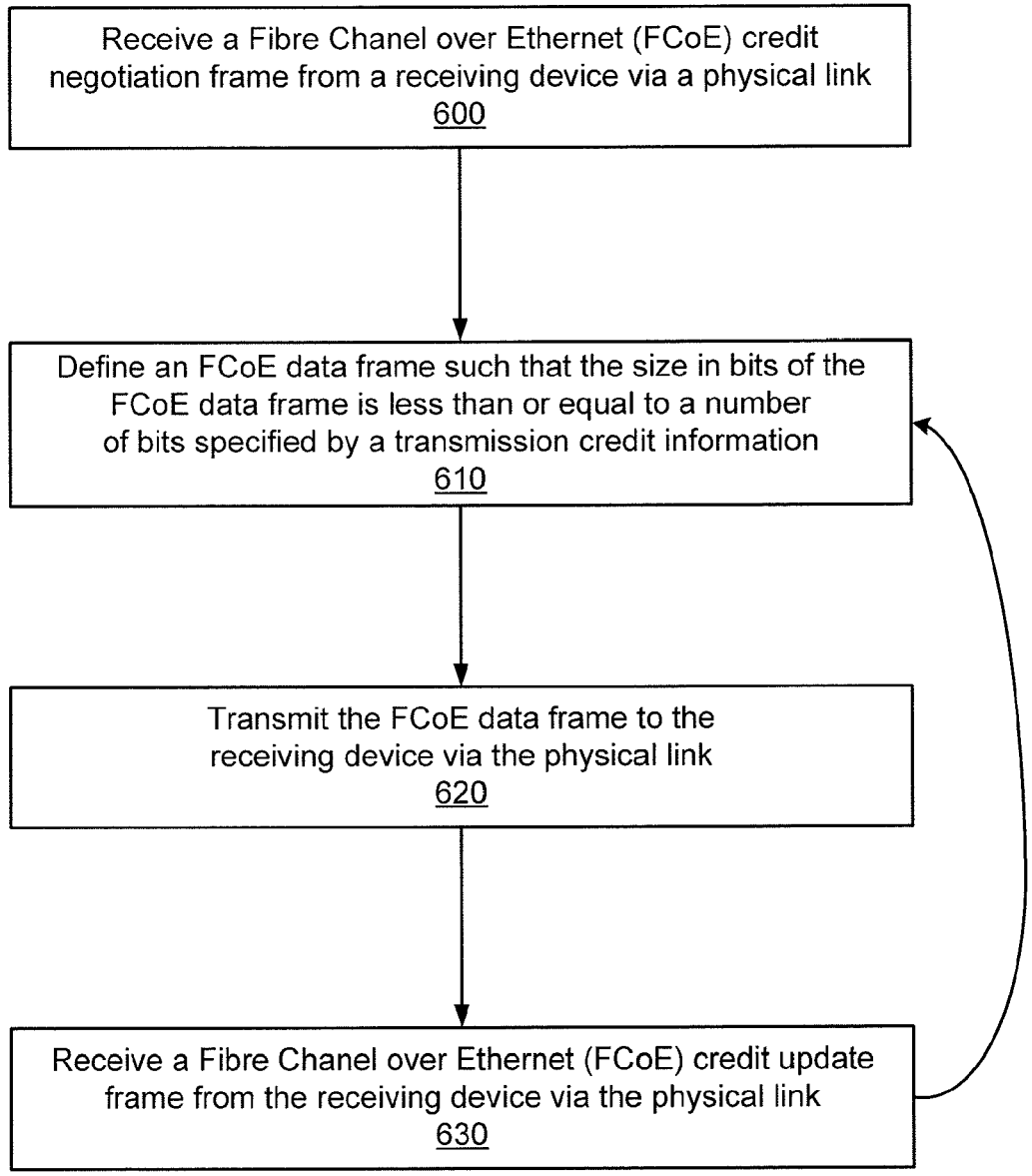
FIG. 6 is a flow chart that illustrates a method of transmitting data from a transmission device to a receiver device based on an FCoE credit-based flow control paradigm, according to an embodiment.

FIG. 6 is a flow chart that illustrates a method of transmitting data from a transmission device to a receiver device based on an FCoE credit-based flow control model, according to an embodiment.

A transmission device, such as a server device, can receive an FCoE credit negotiation frame from a receiver device via a physical link, 600. In some embodiments, the transmission device can be a peripheral processing device as discussed in connection with FIGS. 1-4C above. The transmission device can alternatively be or be included in an "edge" device as discussed in connection with FIGS. 1-4C above. In some embodiments, the receiver device can be an edge device operatively and/or physically coupled to a datacenter switch fabric. The receiver device can alternatively be or be included in a peripheral processing device. In some embodiments, the physical link can be a wired/physical or wireless Ethernet link operatively and/or physically coupled to the transmission device and the edge device. The FCoE credit negotiation frame can include an Ethernet header and an Ethernet payload, the Ethernet payload including a Fibre Channel header and a Fibre Channel payload. In some embodiments, the Fibre Channel payload can include transmission credit information that indicates a number of bits authorized for transmission by the transmission device to the edge device.

A module included in the transmission device can define an FCoE data frame such that the size in bits of the FCoE data frame is less than or equal to a number of bits specified by the transmission credit information, 610. In some embodiments, one or more module included in the transmission device can define an FCoE header of the FCoE data frame based at least in part on addressing information of the transmission device and the receiver device. In some embodiments, one or more modules included in the transmission device can define an FCoE payload of the FCoE data frame that includes data queued for transmission to the receiver device.

The transmission device can transmit the FCoE data frame to the receiver device via the physical link, 620. In some embodiments, the transmission device can transmit the FCoE data frame via or using a communication module included in the transmission device and operatively and/or physically coupled to the physical link. In such embodiments, the communication module can be a software module operatively coupled to a network interface card (NIC) and/or Fibre Channel network adapter.

The transmission device can receive an FCoE credit update frame from the receiving via the physical link, 630. As described in connection with FIG. 4A above, the FCoE credit update frame can include an Ethernet header and an Ethernet payload, the Ethernet payload including a Fibre Channel header and a Fibre Channel payload. In some embodiments, the Fibre Channel payload can include transmission credit information that indicates a number of bits authorized for transmission by the transmission device to the receiver device.

As shown in FIG. 6, in some embodiments, the transmission device can repeat steps 610-630 in sequence as it receives subsequent FCoE credit update frames and has additional queued data to be included in one or more FCoE data frames.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments an edge device and a peripheral processing device in a data center fabric can be included in a single hardware device or module.

What is claimed is:

1. An apparatus, comprising:
 an intake buffer module;
 a flow control module configured to define a first Ethernet frame such that a device that receives the first Ethernet frame modifies a flow of outgoing frames, the first Ethernet frame including a Fibre Channel header and a payload, the payload including a buffer credit indicator representing a number of unallocated bits within the intake buffer module; and
 a transceiver module configured to receive, from the device, a second Ethernet frame indicating the device has not received the buffer credit indicator, the transceiver module configured to transmit the first Ethernet frame to the device in response to the second Ethernet frame, the transceiver module configured to receive a third Ethernet frame from the device, a size of the third Ethernet frame being based at least in part on the number of unallocated bits.

2. The apparatus of claim 1, wherein the Fibre Channel header includes a frame type indicator.

3. The apparatus of claim 1, wherein the transceiver module is included in an edge device operatively coupled to a switch fabric.

4. The apparatus of claim 1, wherein the Fibre Channel header includes a destination port identifier (ID) associated with the device.

5. The apparatus of claim 1, wherein the payload includes an operation code indicator indicating that the first Ethernet frame includes updated buffer credit information.

6. The apparatus of claim 1, wherein the payload includes an operation code indicator indicating that the first Ethernet frame includes information associated with credit frame exchange initialization.

7. The apparatus of claim 1, wherein the Fibre Channel header includes a source port identifier (ID) and a destination port identifier (ID), the source port ID and the destination port ID each including one of:
 VF_port address information identifying a Fibre Channel end node;
 VN_port address information identifying a Fibre Channel link attachment node; or
 VE_port address information identifying a Fibre Channel expansion node.

8. The apparatus of claim 1, wherein the first Ethernet frame is a Fibre Channel over Ethernet (FCoE) frame.

9. An apparatus, comprising:
 a transceiver module configured to receive a first Fiber Channel over Ethernet (FCoE) frame that includes a transmission credit indicator indicating a number of bits allocated for receipt by an edge device; and
 a flow control module configured to receive the transmission credit indicator from the transceiver module, the flow control module configured to transmit a first signal configured to cause the transceiver module to transmit a second FCoE frame to the edge device if a frame size of the second FCoE frame is less than or equal to the number of bits indicated by the transmission credit indicator, the flow control module configured to transmit a second signal configured to cause the transceiver module to transmit a third FCoE frame that prompts the edge device to retransmit the first FCoE frame if the transceiver module has not received the first FCoE frame after a predetermined amount of time.

10. The apparatus of claim 9, wherein the first FCoE frame includes a Fibre Channel header and a payload, the payload including the transmission credit indicator.

11. The apparatus of claim 9, wherein the transceiver module is included within a converged network adapter (CNA) device.

12. The apparatus of claim 9, wherein the FCoE frame includes a Fibre Channel header, the Fibre Channel header including a virtual local area network (VLAN) identifier (ID).

13. The apparatus of claim 9, wherein the transceiver module and the flow control module are operatively coupled to a storage area network.

14. The apparatus of claim 9, wherein the first FCoE frame includes an operation code indicator indicating that the first FCoE frame includes updated transmission credit information.

15. An apparatus, comprising:
an intake buffer module;
a flow control module configured to define an available bits indicator, the available bits indicator representing a number of unallocated bits within the intake buffer module;
a transceiver module configured to receive a credit recovery frame from a peripheral device, the transceiver module configure to transmit, in response to receiving the credit recovery frame, a credit update frame to the peripheral device and based at least in part on the available bits indicator, the transceiver module configured to receive an Fibre Channel over Ethernet (FCoE) frame from the peripheral device, a size of the FCoE frame being less than or equal to the number of unallocated bits; and
a switch fabric interface module to be operatively coupled to a plurality of switch fabric devices that define at least a portion of a switch fabric, the switch fabric interface module configured to define at least one cell based at least in part on the FCoE frame, the switch fabric interface module configured to transmit the at least one cell to at least one switch fabric device from the plurality of switch fabric devices.

16. The apparatus of claim 15, wherein the flow control module is further configured to define a credit negotiation frame that initializes information exchange with the peripheral device, and
the transceiver module is configured to transmit the credit negotiation frame to the peripheral device upon receipt of an initial FCoE frame from the peripheral device.

17. The apparatus of claim 15, wherein the credit update frame includes:
a Fibre Channel header; and
a payload, including:
a transmission credit amount; and
an operation code.

18. The apparatus of claim 15, wherein the intake buffer module, the flow control module, the transceiver module, the switch fabric interface module and the portion of the switch fabric are housed in a single chassis.

19. The apparatus of claim 15, wherein the flow control module is further configured to transmit the credit update frame to an FCoE-enabled switching device.

20. The apparatus of claim 15, wherein the credit recovery frame indicates that the peripheral device has not received the credit update frame from the transceiver module for a specified amount of time.

* * * * *